United States Patent
Severinsson

(10) Patent No.: US 6,705,435 B2
(45) Date of Patent: Mar. 16, 2004

(54) DISC BRAKE

(75) Inventor: Lars Severinsson, Hishult (SE)

(73) Assignee: Haldex Brake Products AB (SE)

(*) Notice: Subject to any disclaimer, the term of this patent is extended or adjusted under 35 U.S.C. 154(b) by 0 days.

(21) Appl. No.: 10/160,882

(22) Filed: Jun. 3, 2002

(65) Prior Publication Data

US 2003/0029681 A1 Feb. 13, 2003

Related U.S. Application Data

(63) Continuation of application No. PCT/SE00/02402, filed on Dec. 1, 2000.

(30) Foreign Application Priority Data

Dec. 2, 1999 (SE) .............................. 9904397

(51) Int. Cl.[7] ............................................. F16D 55/16
(52) U.S. Cl. ..................................... 188/72.8; 188/158
(58) Field of Search ............................ 188/72.7, 72.8, 188/156, 157, 158, 159, 160, 161, 162

(56) References Cited

U.S. PATENT DOCUMENTS 6,264,011 B1 * 7/2001 Zernickel .................. 188/72.8
6,279,691 B1 * 8/2001 Takahashi et al. ......... 188/72.8
6,491,140 B2 * 12/2002 Usui et al. .................. 188/158

FOREIGN PATENT DOCUMENTS

WO    WO-99/02885 A1 * 1/1999

* cited by examiner

Primary Examiner—Jack Lavinder
Assistant Examiner—Thomas Williams
(74) Attorney, Agent, or Firm—St. Onge Steward Johnston & Reens LLC

(57) ABSTRACT

A disc brake for a heavy road vehicle has a caliper arranged at a brake disc mounted on a wheel axle of the vehicle. A thrust rod of the disc brake transforms a rotational ingoing movement from a drive means into a linear outgoing movement for transmission to a disc brake pad, intended for braking engagement with the brake disc. The thrust rod has a non-rotatable spindle, a rotatable nut member in thread engagement with the spindle, and a thrust rod gear for receiving the ingoing rotational movement. A biased roller and ramp arrangement is operationally interposed between the nut member and the thrust rod gear and is intended for rotating the nut member on the spindle at a low counterforce in the spindle and for axially transferring the nut member with the spindle at a high counterforce in the spindle.

11 Claims, 6 Drawing Sheets

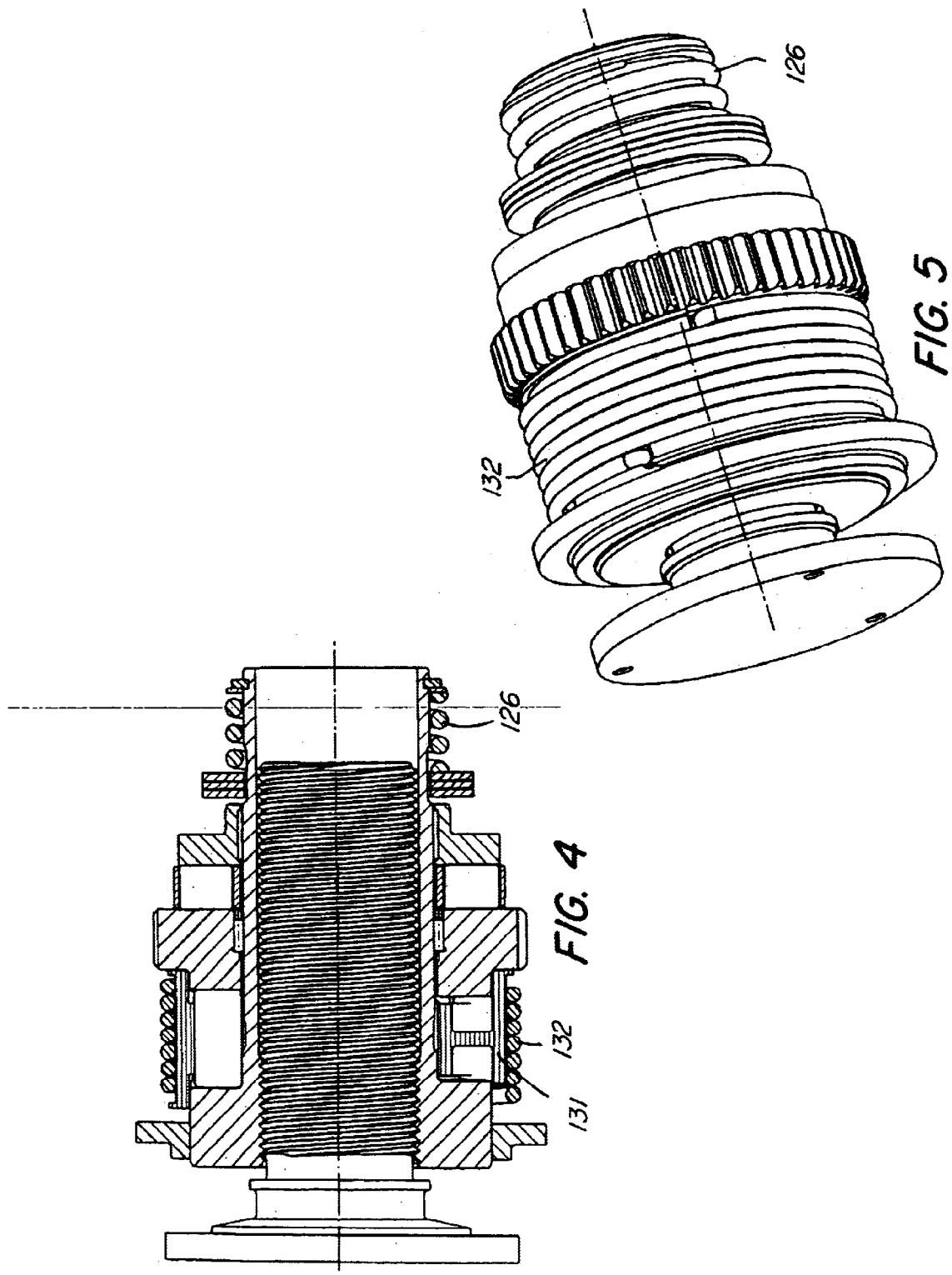

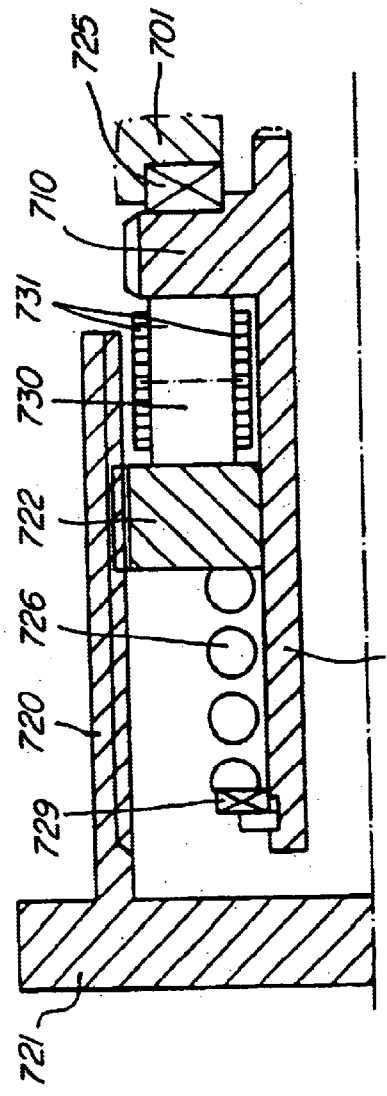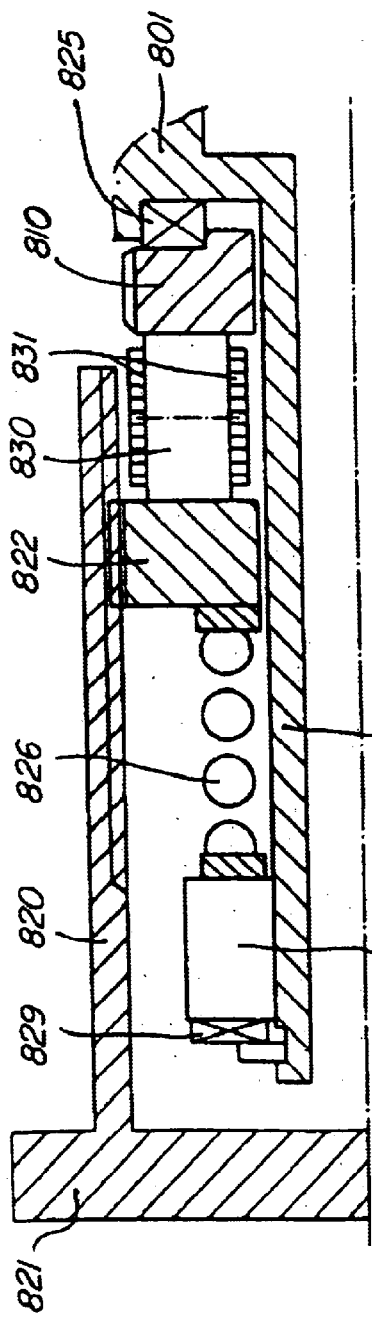

DISC BRAKE

This application is a continuation of pending International Application PCT/SE00/02402 filed Dec. 1, 2000, which designates the United States and claims priority of Swedish Application No. 9904397-8 filed on Dec. 2, 1999.

FIELD OF THE INVENTION

The present invention relates to a disc brake, particularly for a heavy road vehicle, having a caliper arranged in the vicinity of at least one brake disc mounted on a wheel axle of the vehicle.

BACKGROUND OF THE INVENTION

Pneumatically operated disc brakes for heavy road vehicles, such as buses, trucks and trailers, have become more customary during recent years. It has appeared that the tough requirements on such brakes have led to designs that differ rather drastically from disc brake designs used for lighter vehicles and most often hydraulically operated.

The development at the present time is towards more use of electric equipment and electric control for more and more functions on the vehicles and system integration in the vehicles in order to achieve enhanced performance, for example dynamic stability control, rollover protection, and collision avoidance.

Also, by the use of electric power it is possible to dispense with air tanks and similar equipment.

It is thus quite natural that the possibility to use electric power also for braking a heavy road vehicle provided with brake discs is being discussed.

An electric disc brake may have a rotary electric motor as its means for creating mechanical power. This rotational movement has to be transformed into a linear movement for brake application. The brake application movement can be divided in a portion before a brake pad reaches the brake disc, in which the movement can occur with high speed and low force, and then the portion with the braking itself, in which only little movement with high force shall occur.

The main object of the invention is to attain means for creating such a movement in an effective, reliable and cost-effective way.

SUMMARY OF THE INVENTION

This object is according to the invention attained by a thrust rod for transforming a rotational ingoing movement from a drive means—the electric motor—into a linear outgoing movement for transmission to the disc brake pad, intended for braking engagement with the brake disc, the thrust rod having a non-rotatable member, preferably a spindle,
a rotatable nut member in thread engagement with the non-rotatable member,
a thrust rod gear for receiving the ingoing rotational movement, and
operationally interposed between the nut member and the thrust rod gear—a biased roller and ramp arrangement for rotating the nut member on the non-rotatable member at a low counterforce in the non-rotatable member and for axially transferring the nut member with the non-rotatable member at a high counterforce in the non-rotatable member.

In a practical and preferred embodiment of the invention—with the non-rotatable member being a spindle—the thrust rod gear is rotatably arranged on the nut member, and rollers with axes radial to the spindle are arranged between radial parallel ramp surfaces, having a pitch or inclination and being arranged on the thrust rod gear and the nut member, respectively.

The roller and ramp arrangement is preferably spring biased, either by means of a compression spring or a coiled spring.

The pitch of the ramp surfaces may simply be constant over their lengths, but in order to adopt the function after the characteristics of the motor the pitch can vary over the their lengths. Especially, the pitch can be larger in the beginning of the ramp surfaces than in the remainder thereof.

It is necessary for a proper function that the rollers return to their intended original or start positions between the ramps after each brake cycle. If not, a new brake application may not obtain full capacity.

This may according to the invention be attained by means for transmitting the force of the compression spring to the nut only in the rotational direction of the latter for a return stroke of the disc brake.

Practically, this may be attained in that the compression spring is arranged between the caliper and an end plate attached to a flanged shaft, extending into the nut, an axial bearing being arranged between the nut and the flanged shaft and a one-way coupling being arranged between the nut and the flanged shaft.

With this design the nut rotates on the bearing without any influence from the one-way coupling during a brake application, whereas relative rotation between the nut and the flanged shaft will be blocked by the one-way coupling during a return stroke. Hereby, the rollers will be forced back to their original positions, before the nut starts to rotate.

As a modification, the non-rotatable member may be a sleeve, in which the nut is arranged.

BRIEF DESCRIPTION OF THE DRAWINGS

The invention will be described in further detail below reference being made to the accompanying drawings, in which FIG. 4 is a section to a smaller scale through a modified thrust rod, FIG. 5 is a perspective view to a smaller scale of the modified thrust rod of FIG. 4.

FIG. 7 is a simplified section through an "inverted" thrust rod design generally corresponding to FIG. 2, and FIG. 8 is a simplified section through another "inverted" thrust rod design generally corresponding to FIG. 6.

DETAILED DESCRIPTION OF DRAWINGS

Figure 1:
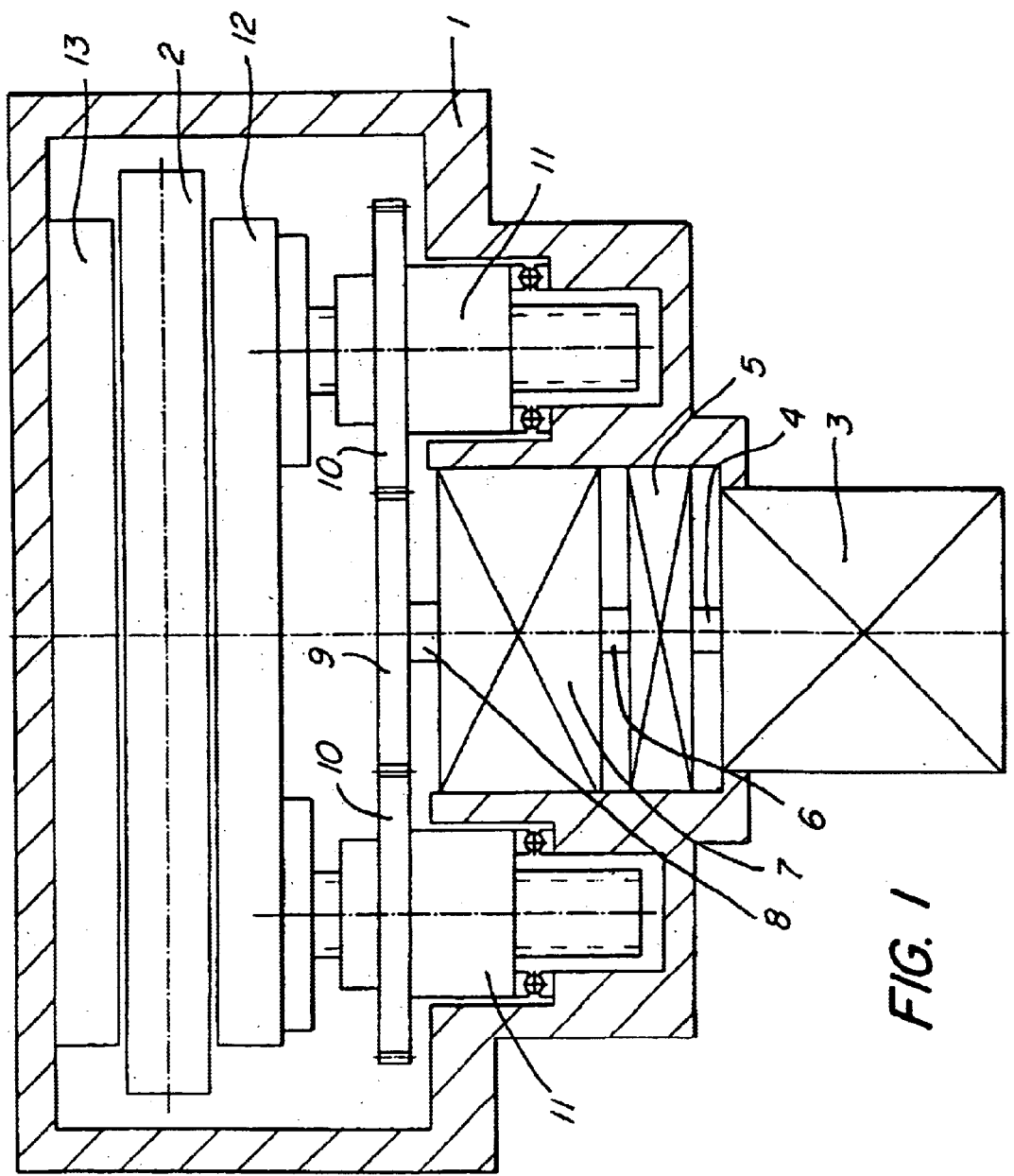
FIG. 1 is a schematic top view, partly in section, of a disc brake according to the invention.

A disc brake according to the invention is very schematically shown in FIG. 1, to which reference first is made. A disc brake caliper 1 is to be mounted astraddle of a brake disc 2 on a vehicle axle. The vehicle is preferably a heavy road vehicle, such as a bus, a truck or a trailer, but the invention is also applicable to other vehicles.

An electric motor 3 is attached to the caliper 1. Its drive shaft 4, which may be rotated in either direction by the motor 3, is connected to a coupling 5 of the kind that keeps its outgoing coupling shaft 6 non-rotatable or braked in a brake release direction, when no current is supplied to the motor 3. This coupling 5 may have either of a number of different designs:

a) Electromagnetic coupling. The shaft 6 is locked in a brake release direction, when an electromagnet in the coupling is energized.

b) Inverse electromagnetic coupling. The shaft 6 is locked in the release direction with a spring activated lock mechanism and is released, when an electromagnet in the coupling is energized.

c) Motor-actuated coupling. The shaft 6 is locked in the release direction by means of a mechanical lock mechanism (of locking spring type or lamella type). The function of the mechanism is such that rotation of the motor 3 in the brake release direction unlocks the coupling and allows a rotation of the shaft 6 corresponding to the rotation of the motor.

d) Motor-actuated and inverse electromagnetic coupling. The shaft 6 is locked in the release direction by means of a mechanical lock mechanism (of locking spring type or lamella type). The function of the mechanism is such that rotation of the motor in the brake release direction unlocks the coupling and allows a rotation of the shaft 6 corresponding to the rotation of the motor. The shaft 6 can also be released in the brake release direction in that an electromagnet in the coupling is energized.

A coupling 5 of any of the two latter types is normally used in the brake according to the invention. A coupling 5 of the last-mentioned type may be applicable if the total brake system requires two independent ways of abolishing the brake force for security reasons.

Couplings of types b) and c) can be supplemented with a manual release mechanism.

The coupling shaft 6 is in turn connected to a gear box 7 for reducing the rotational speed from the coupling shaft 6 to its outgoing gearbox shaft 8. The gear mechanism is preferably a planetary gearing, but other mechanisms are also conceivable. The gear ratio can be chosen according to the specific requirements.

Figure 2:
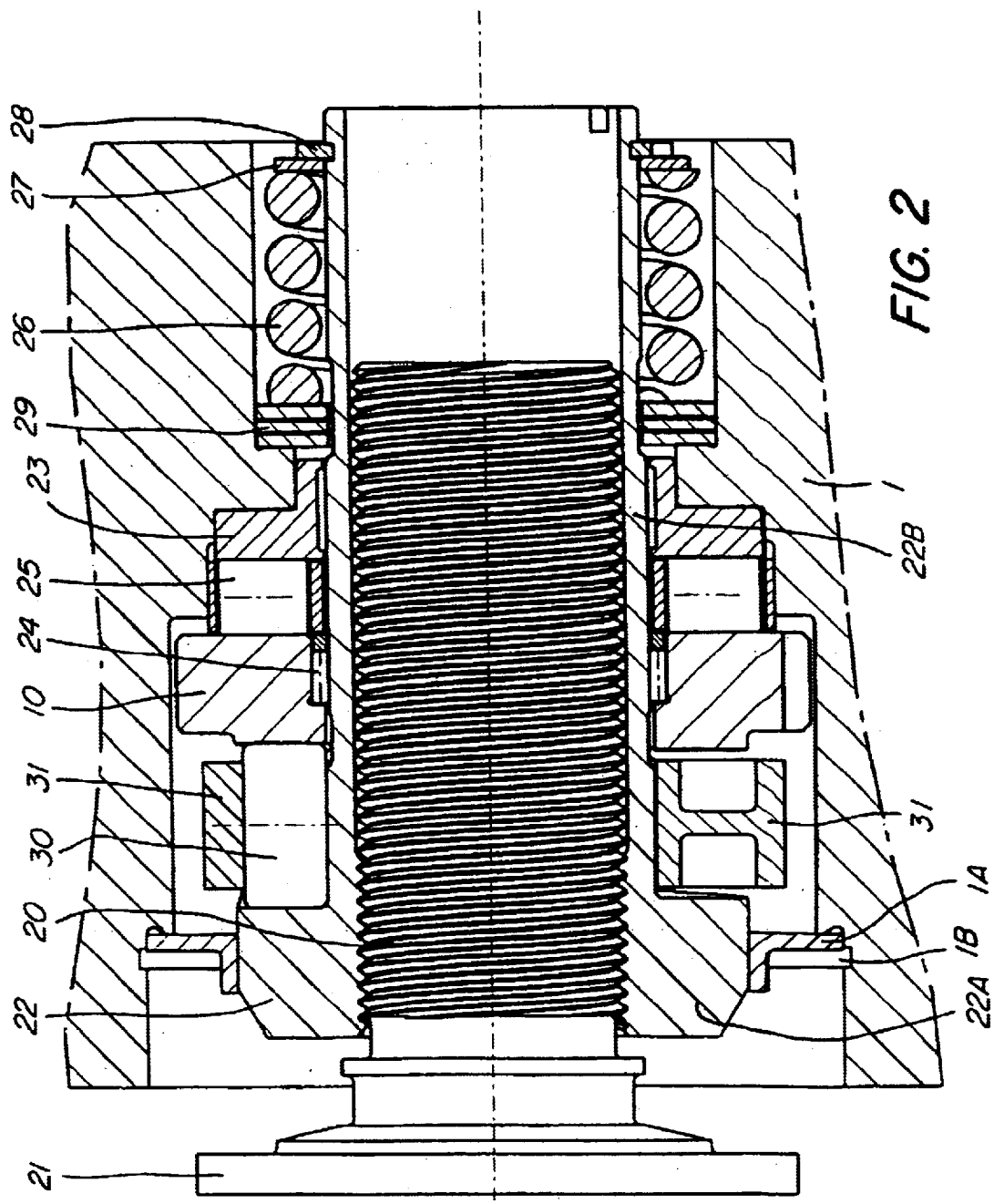
FIG. 2 is a section through a thrust rod mounted in the disc brake according to the invention.
Figure 3:
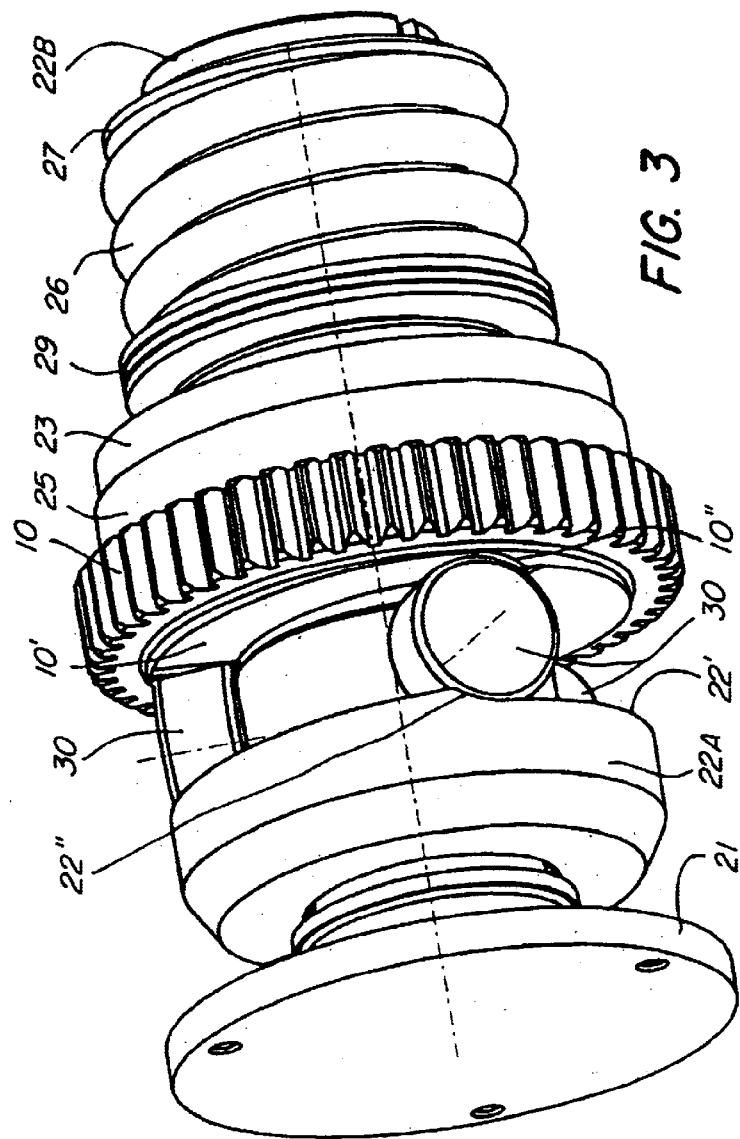
FIG. 3 is a perspective view of the thrust rod.

The gearbox shaft 8 is provided with a gear 9 in gear engagement with a thrust rod gear 10 of each of two thrust rods 11 to be further described under reference to FIGS. 2 and 3. The three gears 9 and 10 may have the same diameter and rotate with the same speed. However, depending on the circumstances, they may have different diameters. In the shown case the different members are arranged in a common plane, but it will equally well be possible to have the motor 3 with the coupling 5 and the gear box 7 in another plane than the axes of the two thrust rods 11, so that a space-saving design may be accomplished.

The thrust rods 11 will perform the general function of transforming the ingoing rotational movement of the gear 10 into an outgoing linear movement of a part connected to the first disc brake pad 12. In principle, the thrust rods 11 could thus be of a screw-and-nut design, such as so called ball screws or the like, but in a practical case another design to be described is chosen.

The thrust rods 11 are connected to a first disc brake pad 12 at one side of the brake disc 2. At the other side of the brake disc 2 there is a second disc brake pad 13 connected to the caliper 1, which is of the so called floating type, i.e. it is mounted for certain movements perpendicularly to the disc 2.

With the briefly described design the first disc brake pad 12 will be applied against the brake disc 2, when the motor 3 is rotated in its application direction. At a motor rotation in the opposite direction the disc brake pad 12 will be withdrawn from the brake disc 2.

The design of each of the thrust rods 11 will now be described under reference to FIGS. 2 and 3.

A threaded spindle 20 is at its end extending out of the thrust rod 11 provided with an attachment plate 21 for attachment to the first disc brake pad 12 (FIG. 1). (Alternatively, the attachment plate 21 may be a separate part rotationally locked to the spindle 20.) There is a rotational lock (not shown) between the attachment plate 21 and the caliper 1. The spindle 20 is thus non-rotatably mounted. A nut member 22 comprises a nut 22A and an elongated tube 22B integral with each other. The nut 22A is in thread engagement with the spindle 20, which is then basically enclosed by the tube 22B. The nut member 22 is guided at its tube 22B by a fixed ring 23 secured to the caliper 1 (FIG. 2) and also at its nut 22A by an annular slide member 1A held to the caliper 1 by a locking ring 1B.

The thrust rod gear 10 is rotatable on the tube 22B by means of a radial bearing 24 and in relation to the fixed ring 23 by means of an axial bearing 25.

An axial bias to the right in FIGS. 2 and 3 is exerted on the nut member 22 by means of a compression spring 26 arranged between on one hand an annular washer 27 and a spring clip 28 in a groove on the tube 22 and on the other hand a bearing 29 cooperating with a caliper flange part, which as shown in FIG. 2 extends down to the right of the ring 23 fastened to the caliper.

Force-transmitting rollers 30, preferably three rollers equidistantly distributed around the periphery of the tube 22B, are arranged with their axes radial to the spindle 20 between radial surfaces—to be described—on the sides facing each other of the thrust rod gear 10 and the nut 22A. The rollers 30 are rotatably held in a roller cage 31 (which is omitted in FIG. 3 for the sake of clarity) with a width smaller than the diameter of the rollers 30 so as not to interfere with the free rolling thereof.

As appears from FIG. 3, said radial surfaces 10' and 22' of the thrust rod gear 10 and the nut 22, respectively, are parallel ramp surfaces each having a small inclination or pitch in relation to a plane perpendicular to the axis of the spindle 20. These ramp surfaces 10', 22' have end surfaces 10", 20", against which a roller 30 is applied (under the bias of the compression spring 26) in a rest position shown in FIG. 3.

The function at a brake application of the disc brake described above with reference to FIG. 1 and especially of its thrust rods 11 described above with reference to FIGS. 2 and 3 is as follows, starting from a situation as shown in FIG. 1 with the disc brake pad 12 at a certain distance from the brake disc 2 and as shown in FIG. 3 with the rollers 30 in the described rest positions. The electric motor 3 is rotated in its direction for brake application, and this rotation is transferred via the coupling 5, the gear box 7, and the gear 9 to the respective thrust rods 11.

The rotation is imparted to the thrust rod gear 10. As long as the brake pad 12 has not reached the brake disc 2, there is no substantial counterforce in the thrust rod spindle 20. The rollers 30 are held in their rest positions against the ramps, as shown in FIG. 3, and the rotation of the thrust rod gear 10 is transferred to the nut member 22 via the rollers 30, so that the spindle 20 is brought axially forward, until contact between the disc brake pad 12 and the brake disc 2 has been established and a counterforce has been built up.

At this stage and at a continued rotation of the thrust rod gear 10 the rollers 30 will begin to roll along their respective ramp surfaces 10', 22', so that the nut member 22 and thus the spindle 20 will be brought forward axially with a great force for accomplishing a brake application.

Conversely, when hereafter the motor 3 is rotated in the opposite direction for a return stroke, the rollers 30 will first roll down their respective ramp surfaces 10', 22' for reestablishing the positions shown in FIG. 3. At this movement the spindle 20 will be brought back, so that the counterforce therein decreases. At the continued rotation the bias of the spring 26 will again see to it that the rotation of the thrust rod gear 10 is transferred via the rollers 30 to the nut member 22, which will pull back the spindle 20. Means can be provided to ensure that this return rotation is concluded, when a suitable distance or slack has been established between the disc brake pad 12 and the brake disc 2. For example, the measured number of rotations can be used to control this distance or slack. Also, the wear of the brake pads 12 and 13 is compensated for when the new slack is established. The thread length of the spindle 20 must be able to accommodate the entire wear of the brake pads 12 and 13.

The inclination or pitch of the ramp surfaces 10', 22' may as shown in FIG. 3 be even over the entire length of the surfaces, but it is equally possible to vary the pitch over the length. For example, it may be suitable to have a larger pitch in the beginning of the ramp surfaces and then to decrease it in order to make better use of the characteristics of the motor 3.

A modification of the thrust rod 11 according to FIGS. 2 and 3 is shown in FIGS. 4 and 5. Only the modification as such will be described. In other respects the thrust rod 11 is unchanged. For the sake of clarity only such reference numerals that are necessary for an understanding of the modification are used in FIGS. 4 and 5.

In the version of FIGS. 2 and 3 the spring arrangement 26–29 had the primary purpose of applying a bias on the roller and ramp arrangement 30, 10', 22' for obtaining the function described above.

A similar spring arrangement is provided in the modification according to FIGS. 4 and 5, but its compression spring 126 provides a comparatively small force only to keep the different parts of the thrust rod 11 together.

The necessary bias for the roller and ramp arrangement is instead provided by a coiled spring 132 supported by a slightly modified roller cage 131. The respective ends of this coiled spring 132 are attached to the thrust rod gear 10 and the nut 22A, as is illustrated in FIG. 5.

The function of the modified thrust rod 11 is the same as has been described above.

Figure 6:
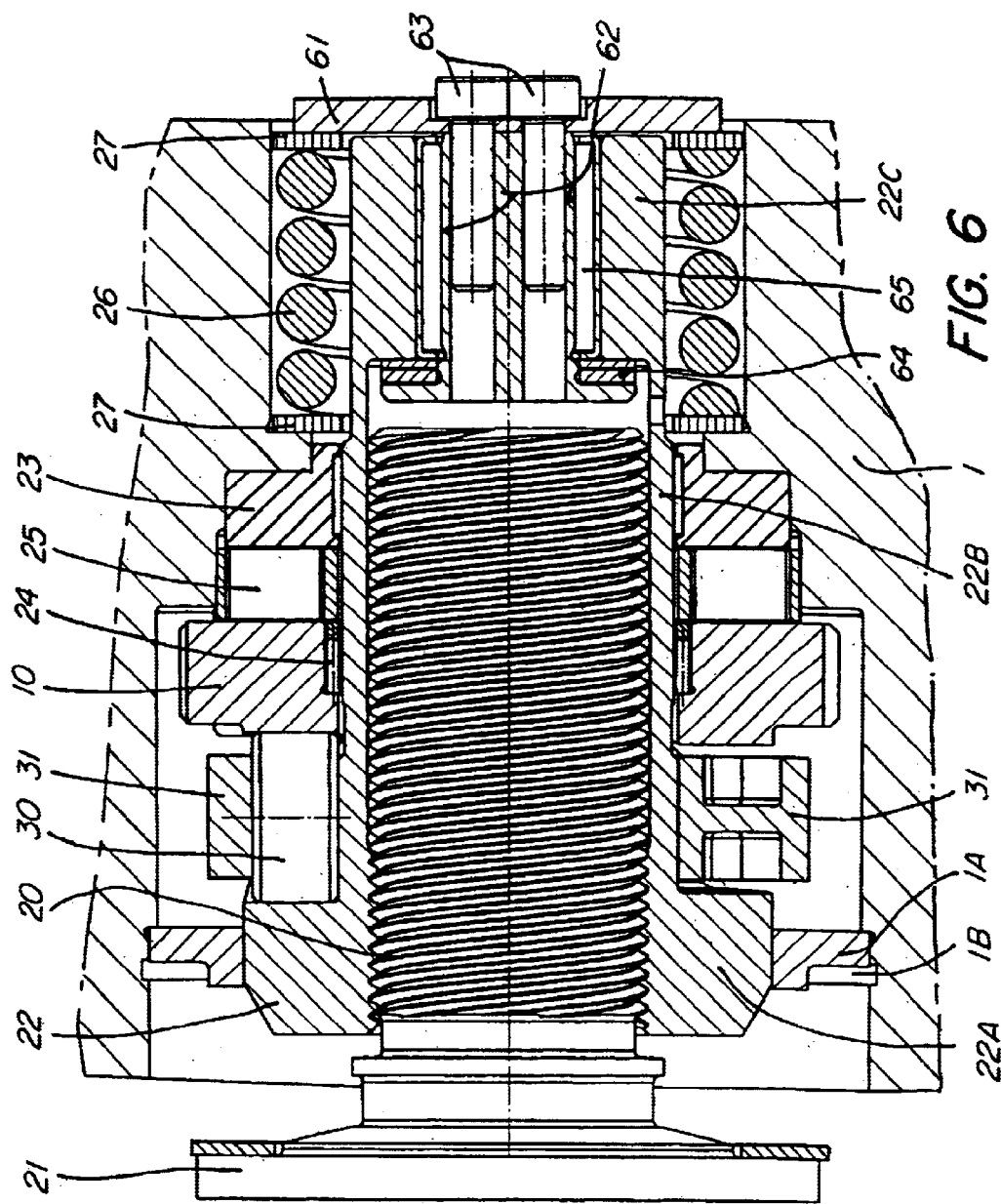
FIG. 6 is a section corresponding to FIG. 2 through another modified thrust rod.

Another modified thrust rod 11 is shown in section in FIG. 6. This FIG. 6 corresponds to FIG. 2, and to the extent possible the same numerals have been used in these two Figures, even if the referenced parts are not identical or substitutable.

Thus, the following parts may be found in FIG. 6: the disc brake caliper 1 with the slide member 1A and the locking ring 1B, the gear 10, the spindle 20, the attachment plate 21, the nut member 22 with its nut 22A and tube 22B, the fixed ring 23, the radial bearing 24, the axial bearing 25, the compression spring 26, the annular washer 27, the rollers 30, and the roller cage 31.

The bearing 29 in the FIG. 2 version is moved to a new location in the FIG. 6 version, as will be described. In the place of the bearing 29 there is instead a second annular washer 27, which may here be called a friction ring for a reason described below.

The compression spring 26 is thus arranged between two friction rings 27, of which the left one in FIG. 6 is supported by the caliper 1 and the right one engages an end plate 61. This end plate 61 is attached to a flanged shaft 62 by means of screws 63, which thus will prevent axial and rotational relative movements between the two parts 61 and 62. Other means for obtaining the same result, for example splines and lock means, are feasible. The nut 22 is in this region provided with a nut hub 22C, and there is an axial bearing 64 (corresponding to the bearing 29 in the FIG. 2 version) between the flange of the shaft 62 and the nut hub 22C. By the described design the force of the compression spring 26 is applied to the right in the Figure on the nut 22, just as in the FIG. 2 version. A one-way coupling 65 of any known design is arranged between the nut hub 22C and the flanged shaft 62.

During a brake application the thrust rod according to FIG. 6 has the same function as the thrust rod according to FIG. 2 with the nut 22 rotating on the bearing 64 (corresponding to the bearing 29 in FIG. 2). In this rotational direction the one-way coupling allows free rotation.

During the return stroke the rotation of the flanged shaft 62 relative to the nut 22 will be blocked by the one-way coupling 65, which means that a sliding movement will have to occur at any of the friction rings 27 at the rotation of the nut 22 in the return direction.

In turn this means that at the rotation of the gear 10 in the return direction the rollers 30 will be forced to return to their desired positions at the ramp end surfaces 10" and 22" (FIG. 3), before the nut 22 starts to rotate. After each brake cycle the rollers 30 will accordingly attain their proper positions, ready for a new operation.

As an alternative to the design according to FIG. 6 it would be possible to have an axial arrangement of the spring 26, a sleeve around the nut tube 22B, and an axial bearing supported by a spring ring or flange on the nut tube, a one-way coupling being arranged between the nut tube and the sleeve.

In both cases the result of the described designs is that the return moment is transmitted via the spring 26 and also that the same spring 26 keeps the ramps 10', 22' engaged with the rollers 30 and creates the return moment, so that the rollers 30 assume a correct position for the next operation sequence.

In the thrust rod designs so far described the general principle is that a nut member rotates on a central spindle, which is connected to an attachment plate for a disc brake pad and thus is non-rotatable. In the designs shown in FIGS. 7 and 8 the principle is "inverted", i.e. there is a non-rotatable sleeve, which is connected to or integral with the attachment plate and corresponds to the nut member, and a nut member rotatable therein.

In FIGS. 7 and 8 members corresponding to similar members in earlier designs have been provided with corresponding reference numerals with the prefix 7 and 8, respectively.

In FIG. 7, showing an "inverted" device generally corresponding to that of FIG. 2, there is a non-rotatable sleeve member 720, which is integral with or connected to an attachment plate 721 for a disc brake pad. The sleeve member 720 is provided with an internal thread, with which a nut member 722 is in thread engagement.

A thrust rod gear member 710 is rotationally supported in a caliper portion 701 over an axial bearing 725. The gear member 710 is rotationally driven by drive members of the brake as is apparent from the description above. The gear member 710 has a cylindrical extension 710', on which the nut member 722 is movably arranged.

Force-transmitting rollers 730 in roller cages 731 are arranged between ramp surfaces on the gear member 710 and the nut member 722. A compression spring 726 for biasing the nut member 722 against the rollers 730 is supported by the extension 710' via an axial bearing 729.

As a modification the gear member may be driven at gears at the axial right hand end of the extension 710'.

The function of this simplified device is generally the same as that of the FIG. 2 device.

In FIG. 8, showing an "inverted" device generally corresponding to that of FIG. 6, the following parts may again be found: a non-rotatable sleeve member 820, an attachment plate 821, a nut member 822, a thrust rod gear member 810, a caliper portion 801, an axial bearing 825, force-transmitting rollers 830, roller cages 831, a compression spring 826, and an axial bearing 829.

A cylindrical extension 801', on which the nut member 822, the compression spring 826, and the axial bearing 829 are arranged, is in this case a fixed extension of the caliper portion 801. Also the thrust rod gear member 810 is arranged on this extension 801'. A one-way coupling 832 is further arranged on the extension 801' between the compression spring 826 and the axial bearing 829.

The function of this simplified device is generally the same as that of the FIG. 6 device.

The disc brake has been shown and described in its use together with one brake disc, but it is to be understood that it may be used also when there are more than one brake disc in an arrangement, for example two brake discs.

What is claimed is:

1. A disc brake, particularly for a heavy road vehicle, having a caliper arranged in the vicinity of at least one brake disc mounted on a wheel axle of the vehicle, comprising: a thrust rod for transforming a rotational ingoing movement from a drive means into a linear outgoing movement for transmission to a disc brake pad, intended for braking engagement with the at least one brake disc, the thrust rod having a non-rotatable member, a rotatable nut member in thread engagement with the non-rotatable member, a thrust rod gear for receiving the ingoing rotational movement, and a biased roller and ramp arrangement operationally interposed between the nut member and the thrust rod gear for rotating the nut member on the non-rotatable member at a low counterforce in the non-rotatable member during an earlier stage of brake application where contact between the disc brake pad and the brake disc has not been established, and for axially transferring the nut member with the non-rotatable member at a high counterforce in the non-rotatable member during a later stage of brake application after contact between the disc brake pad and the brake disc has been established, wherein the non-rotatable member is a spindle, on which the nut member is arranged, wherein the thrust rod gear is rotatably arranged on the nut member and rollers with axes radial to the spindle are arranged between radial parallel ramp surfaces, having a pitch or inclination and being arranged on the thrust rod gear and the nut member, respectively, wherein the roller and ramp arrangement is spring biased, wherein the thrust rod gear and the nut member are biased against each other by means of a compression spring, and characterized by means for transmitting the force of the compression spring to the nut only in the rotational direction of the latter for a return stroke of the disc brake.

2. A disc brake according to claim 1, wherein the thrust rod gear and the nut member are rotationally biased in relation to each other by means of a coiled spring.

3. A disc brake according to claim 1, wherein the rollers are arranged in a roller cage.

4. A disc brake according to claim 1, wherein the inclination or pitch of the ramp surfaces is constant over the entire length of the surfaces.

5. A disc brake according to claim 1, wherein the inclination or pitch of the ramp surfaces varies over the length of the surfaces.

6. A disc brake according to claim 5, wherein the pitch is larger in the beginning of the ramp surfaces than in the remainder thereof.

7. A disc brake according to claim 1, wherein the compression spring is arranged between the caliper and an end plate attached to a flanged shaft, extending into the nut, an axial bearing being arranged between the nut and the flanged shaft and a one-way coupling being arranged between the nut and the flanged shaft.

8. A disc brake according to claim 1, wherein releasing of the brake application is achieved by rotating the nut member on the non-rotatable member in a direction opposite to the direction for the brake application.

9. A disc brake according to claim 8 further including means for measuring rotation of the nut member to compensate the return stroke in response to wearing of the brake pad.

10. A disc brake, particularly for a heavy road vehicle, having a caliper arranged in the vicinity of at least one brake disc mounted on a wheel axle of the vehicle, comprising: a thrust rod for transforming a rotational ingoing movement from a drive means into a linear outgoing movement for transmission to a disc brake pad, intended for braking engagement with the at least one brake disc, the thrust rod having a non-rotatable member, a rotatable nut member in thread engagement with the non-rotatable member, a thrust rod gear for receiving the ingoing rotational movement, and a biased roller and ramp arrangement operationally interposed between the nut member and the thrust rod gear for rotating the nut member on the non-rotatable member at a low counterforce in the non-rotatable member during an earlier stage of brake application where contact between the disc brake pad and the brake disc has not been established, and for axially transferring the nut member with the non-rotatable member at a high counterforce in the non-rotatable member during a later stage of brake application after contact between the disc brake pad and the brake disc has been established, wherein the non-rotatable member is a spindle, on which the nut member is arranged, wherein the thrust rod gear is rotatably arranged on the nut member and rollers with axes radial to the spindle are arranged between radial parallel ramp surfaces, having a pitch or inclination and being arranged on the thrust rod gear and the nut member, respectively, and wherein the inclination or pitch of the ramp surfaces is constant over the entire length of the surfaces.

11. A disc brake, particularly for a heavy road vehicle, having a caliper arranged in the vicinity of at least one brake disc mounted on a wheel axle of the vehicle, comprising: a thrust rod for transforming a rotational ingoing movement from a drive means into a linear outgoing movement for transmission to a disc brake pad, intended for braking engagement with the at least one brake disc, the thrust rod having a non-rotatable member, a rotatable nut member in thread engagement with the non-rotatable member, a thrust rod gear for receiving the ingoing rotational movement, and a biased roller and ramp arrangement operationally interposed between the nut member and the thrust rod gear for rotating the nut member on the non-rotatable member at a low counterforce in the non-rotatable member during an earlier stage of brake application where contact between the disc brake pad and the brake disc has not been established, and for axially transferring the nut member with the non-rotatable member at a high counterforce in the non-rotatable member during a later stage of brake application after contact between the disc brake pad and the brake disc has been established, and wherein the non-rotatable member is a sleeve member, in which the nut member is arranged.

* * * * *